June 25, 1968     J. R. HAEFNER     3,389,941
BEARING LOCKING COLLAR
Filed Oct. 23, 1965
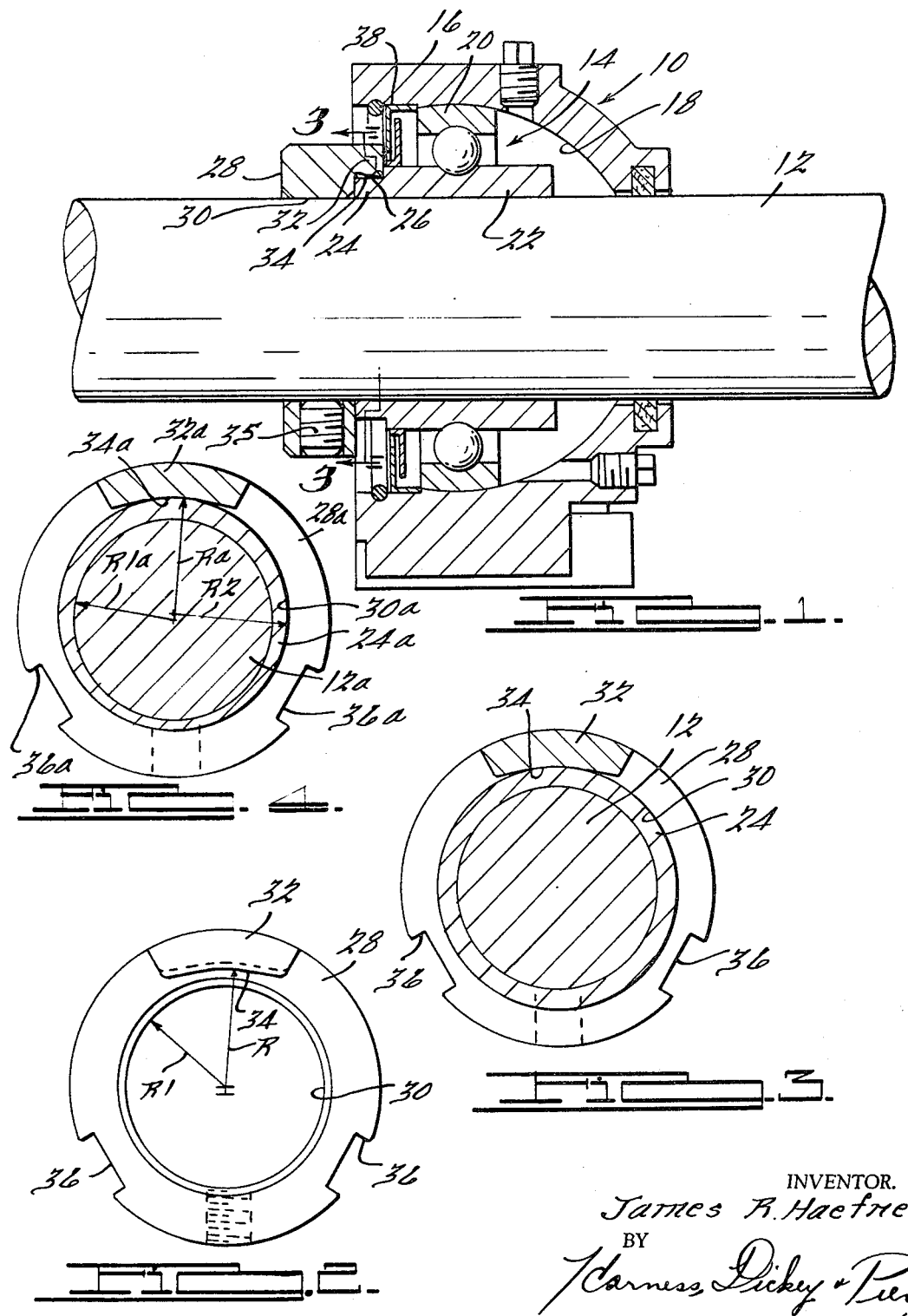
INVENTOR.
James R. Haefner
BY
ATTORNEYS.

United States Patent Office 3,389,941
Patented June 25, 1968

3,389,941
BEARING LOCKING COLLAR
James R. Haefner, Lancaster, Pa., assignor to Federal-Mogul Corporation, Detroit, Mich., a corporation of Michigan
Filed Oct. 23, 1965, Ser. No. 503,824
8 Claims. (Cl. 308—236)

ABSTRACT OF THE DISCLOSURE

A locking collar for locking the inner ring of a bearing onto a rotatable shaft.

---

The present invention relates to locking collars for antifriction bearing rings.

In adapter type bearings the inner ring is located on a rotatable shaft and the outer ring is held to a stationary member with the antifriction members or balls located between the two rings. Since the shaft is to be rotated it is desired to fix the inner ring to the shaft to prevent relative rotation therebetween. To prevent this relative rotation it has become common to utilize a locking collar which cooperates with the inner ring to lock both together to the shaft. Presently the inner ring is provided with an eccentric outside diameter portion while the locking collar is provided with an inner surface of a counterbore which is eccentric. By locating the counterbore over the outside diameter portion and rotating the collar and inner ring relatively to each other the two parts are frictionally wedged together and to the shaft. Normally the collar is provided with a set screw whereby it can be fixed to the shaft. Conventional locking collars are provided with a radial hole to facilitate tightening by a spanner wrench; yet, the common procedure is to tighten the locking collar by placing a center-punch in the radial hole and tapping the punch with a hammer. In the present invention an improved locking collar construction is provided which lends itself to tightening either by a hammer or a spanner wrench. In addition the novel locking collar of the present invention is of a construction which lends itself to more economical fabrication. Therefore, it is a general object of this invention to provide a locking collar having an improved construction.

It is another object of this invention to provide a novel locking collar having improved means for tightening and locking an inner bearing ring onto a shaft.

Other objects, features, and advantages of the present invention will become apparent from the subsequent description and the appended claims, taken in conjunction with the accompanying drawings, in which:

FIGURE 1 is an assembly view with some parts shown in section depicting a preferred form of the locking collar of the present invention in assembly relation with a bearing assembly having an inner race shown secured to a rotatable shaft;

FIGURE 2 is a front elevational view of the locking collar of FIGURE 1; and

FIGURE 3 is a sectional view of the assembly of FIGURE 1 taken substantially along the line 3—3; and FIGURE 4 is a sectional view, to reduced scale, similar to that of FIGURE 3 of a modified form of the invention.

Looking now to the drawings, a pillow block or adapter type bearing is shown and generally indicated by the numeral 10 and is shown mounted to a shaft 12. The pillow block 10 includes a ball bearing assembly 14 pivotably mounted within a housing 16. The housing 16 has a generally spherically contoured inner surface 18 in which an outer race member 20 of bearing assembly 14 is located and can pivot. The outer surface of the race member 20 is accurately contoured to permit pivotal movement within the inner surface 18. An inner ring member 22 of bearing assembly 14 is located upon the shaft 12 and has a reduced diameter lip portion 24 which defines a shoulder 26. A locking collar 28 is provided to lock the inner ring 22 of the bearing assembly 14 to the shaft 12.

The locking collar 28 has a central bore 30 which is of a diameter to matably fit upon the shaft 12. The collar 28 is provided with an axially extending lip portion 32 which has a radially inner bearing surface 34 which is eccentric relative to the bore 30 (i.e., on a radius R as compared to the radius R1 for the bore 30). The surface 34 is flared outwardly at its ends for a purpose to be later described. In a manner similar to surface 34, the lip portion 24 of the inner ring member 22 has its outer surface similarly eccentrically formed relative to the central bore of the ring 22. By locating the locking collar 28 with its lip 32 overengaging the lip portion 24 and by rotating the locking collar 28 the eccentric surface 34 will bind against the eccentric surface on the lip portion 24, thereby frictionally locking the inner ring 22 and the locking collar 28 to the shaft 12. The surface 34 is slightly undercut to enhance its gripping action. A set screw 35 in a radial bore in the locking collar 28 can be threaded inwardly to engage the shaft 12 to lock the collar 28 and hence ring 22 to the shaft 12.

The locking collar 28 is provided with a pair of circumferentially spaced notches or grooves 36 at its outer surface, which notches and grooves 36 can be used to be gripped by a spanner wrench to facilitate the frictional locking; the grooves 36 can also be used to tighten the collar 28 by a hammer and punch. Note that the edges on each side of the surface 34 are flared outwardly; this facilitates engagement of the center portion of surface 34 with the outer surface of lip portion 24. Note that, since surface 34 is flared outwardly on each side, engagement can be made by rotation of the locking ring 28 in either direction.

A sealing assembly 38 is located between the outer opening of the cavity 18 and the inner race 22. The seal assembly 38, however, does not comprise a part of the present invention.

The locking collar 28 is of a simplified structure compared to conventional locking collars in which an eccentric counterbore is provided. The use of a counterbore requires more machining and more material is required in the collar construction. Also, the provision of the grooves 36 permit the use either of a spanner wrench or a punch and a hammer for tightening; in this regard note that the lip 32 can also be utilized with a punch and hammer to tighten the collar 28; thus the spacing of the grooves 36 and lip 32 provides good accessibility around the circumference of shaft 12 for tightening with a hammer and punch.

A modified form of the invention is shown in FIGURE 4 in which components similar to like components in FIGURES 1–3 have been given the same designation with the addition of the postscript *a*. In FIGURE 4 the surface 34*a* has been made concentric with the bore 30*a*, i.e., R*a* and R1*a* are from the same center. However, the outer surface of the lip portion 24*a* of the inner ring 22*a* is still eccentric (along offset radius R2). Again, by merely rotating the locking collar 28*a* in either direction, the surface 34*a* will be moved into frictional engagement with the outer surface of the lip portion 24*a* to lock the ring 22*a* on the shaft 12*a*. Note that by providing the lip portion 32*a* to extend for only a portion of the circumference of the collar 28*a* the surface 34*a* can be made concentric with the bore 30*a* and hence further simplify its construction.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a bearing having an inner ring to be locked to a shaft with the ring having an axially extending lip portion having an outer surface which is eccentric relative to the bore of the inner ring, the improvement comprising: a locking collar having a central bore for receiving the shaft and an axially extending lip extending circumferentially for substantially less than the circumference of said collar and adapted to overengage the lip portion of the inner ring, said lip having an inner surface adapted to engage the eccentric outer surface of the lip portion and being eccentrically formed whereby with said lip overengaging the lip portion relative rotation therebetween will frictionally lock said inner ring and said locking collar to the shaft, said inner surface being flared radially outwardly at both ends to facilitate engagement between said inner surface and the outer surface, a plurality of circumferentially spaced grooves located in the radially outer surface of said collar, and a set screw located in a threaded radially extending bore in said collar for locking said collar to the shaft after said collar and inner ring have been frictionally locked to the shaft.

2. In a bearing having an inner ring to be locked to a shaft with the ring having an axially extending lip portion having an outer surface which is eccentric relative to the bore of the inner ring, the improvement comprising: a locking collar having a central a bore for receiving the shaft and an axially extending lip extending circumferentially for substantially less than the circumference of said collar and adapted to overengage the lip portion of the inner ring, said lip having an inner surface adapted to engage the eccentric outer surface of the lip portion and being concentrically formed relative to said central bore whereby with said lip overengaging the lip portion relative rotation therebetween will frictionally lock said inner ring and said locking collar to the shaft, said inner surface being flared radially outwardly at both ends to facilitate engagement between said inner surface and the outer surface, a plurality of circumferentially spaced grooves located in the radially outer surface of said collar, and a set screw located in a threaded radially extending bore in said collar for locking said collar to the shaft after said collar and inner ring have been frictionally locked to the shaft.

3. In a bearing having an inner ring to be locked to a shaft with the ring having an axially extending lip portion having an outer surface which is eccentric relative to the bore of the inner race, the improvement comprising: a locking collar having a central a bore for receiving the shaft and an axially extending lip extending partially circumferentially and adapted to overengage the lip portion of the inner race, said lip having an inner surface adapted to engage the eccentric outer surface of the lip portion and being eccentrically formed whereby with said lip overengaging the lip portion relative rotation therebetween will frictionally lock said inner ring and said locking collar to the shaft, said inner surface being flared radially outwardly at one end to facilitate engagement between said inner surface and the outer surface.

4. In a bearing having an inner ring to be locked to a shaft with the ring having an axially extending lip portion having an outer surface which is eccentric relative to the bore of the inner race, the improvement comprising: a locking collar having a central a bore for receiving the shaft and an axially extending lip extending partially circumferentially and adapted to overengage the lip portion of the inner race, said lip having an inner surface adapted to engage the eccentric outer surface of the lip portion and being concentrically formed relative to said central bore whereby with said lip overengaging the lip portion relative rotation therebetween will frictionally lock said inner ring and said locking collar to the shaft, said inner surface being flared radially outwardly at one end to facilitate engagement between said inner surface and the outer surface.

5. In a bearing having an inner ring to be locked to a shaft with the ring having an axially extending lip portion having an outer surface with at least a portion thereof being eccentric relative to the bore of the inner ring, the improvement comprising: a locking collar having a central bore for receiving the shaft and an axially extending lip extending partially circumferentially and overengaging the lip portion of the inner ring, said lip being substantially rigidly connected with the remainder of said locking collar and having an inner surface engaging the eccentric portion of the lip portion and being radially located relative to said eccentric portion to engage said eccentric portion whereby with said lip overengaging the lip portion relative rotation therebetween will frictionally lock said inner ring and said locking collar to the shaft, and means supported on said locking collar and engageable with the shaft for locking the shaft and said locking collar together, at least one end of said inner surface being flared radially outwardly to facilitate engagement between said inner surface and the outer surface.

6. In a bearing having an inner ring to be locked to a shaft with the ring having an axially extending lip portion having an outer surface which is eccentric relative to the bore of the inner ring, the improvement comprising: a locking collar having a central bore for receiving the shaft and an axially extending lip extending circumferentially for substantially less than the circumference of said collar and adapted to overengage the lip portion of the inner ring, said lip having an inner surface adapted to engage the eccentric outer surface of the lip portion and being eccentrically formed whereby with said lip overengaging the lip portion relative rotation therebetween will frictionally lock said inner ring and said locking collar to the shaft, said inner surface being flared radially outwardly at both ends to facilitate engagement between said inner surface and the outer surface, a plurality of circumferentially spaced grooves located in the radially outer surface of said collar, and a set screw located in a threaded radially extending bore in said collar for locking said collar to the shaft after said collar and inner ring have been frictionally locked to the shaft, groove means located circumferentially about said locking collar for receiving a tool for rotating said locking collar.

7. In a bearing having an inner ring to be locked to a shaft with the ring having an axially extending lip portion having an outer surface which is eccentric relative to the bore of the inner ring, the improvement comprising: a locking collar having a central bore for receiving the shaft and an axially extending lip extending circumferentially for substantially less than the circumference of said collar and adapted to overengage the lip portion of the inner ring, said lip having an inner surface adapted to engage the eccentric outer surface of the lip portion and being concentrically formed relative to said central bore whereby with said lip overengaging the lip portion relative rotation therebetween will frictionally lock said inner ring and said locking collar to the shaft, said inner surface being flared radially outwardly at both ends to facilitate engagement between said inner surface and the outer surface, a plurality of circumferentially spaced grooves located in the radially outer surface of said collar, and a set screw located in a threaded radially extending bore in said collar for locking said collar to the shaft after said collar and inner ring have been frictionally locked to the shaft, groove means located circumferentially about said locking collar for receiving a tool for rotating said locking collar.

8. In the bearing of claim 5 said last named means comprising a set screw located in a threaded radially extending bore in said collar for locking said collar to the shaft.

References Cited

UNITED STATES PATENTS 2,719,046  9/1955  Frederick ---------- 308—236
2,728,616  12/1955  Potter ------------ 308—236

FOREIGN PATENTS 884,644  12/1961  Great Britain.

MARTIN P. SCHWADRON, *Primary Examiner.*

FRANK SUSKO, *Examiner.*